United States Patent
Omori et al.

(10) Patent No.: US 10,447,891 B2
(45) Date of Patent: Oct. 15, 2019

(54) IMAGE DATA PROCESSING SERVER FOR STORING DEVICE IMAGE DATA AND FOR AUTHENTICATING USER AUTHORIZED SERVICES

(71) Applicant: PFU LIMITED, Kahoku-shi, Ishikawa (JP)

(72) Inventors: Yasuo Omori, Kahoku (JP); Hisashi Yanagisawa, Kahoku (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 14/751,927

(22) Filed: Jun. 26, 2015

(65) Prior Publication Data
US 2016/0255243 A1    Sep. 1, 2016

(30) Foreign Application Priority Data
Feb. 27, 2015 (JP) ................................ 2015-038353

(51) Int. Cl.
*H04N 1/00*     (2006.01)
*H04N 1/44*     (2006.01)

(52) U.S. Cl.
CPC ......... *H04N 1/4413* (2013.01); *H04N 1/4426* (2013.01); *H04N 2201/0094* (2013.01)

(58) Field of Classification Search
CPC ... H04N 1/4413; H04N 1/4406; H04N 1/4426
See application file for complete search history.

(56) References Cited

U.S. PATENT DOCUMENTS

| 9,154,504 B2* | 10/2015 | Kobayashi | H04L 63/10 |
| 2008/0030800 A1* | 2/2008 | Matsukawa | H04N 1/00244 358/474 |
| 2009/0313477 A1* | 12/2009 | Park | G06F 21/33 713/182 |

(Continued)

FOREIGN PATENT DOCUMENTS

| CN | 103200346 A | 7/2013 |
| JP | 2013-065121 A | 4/2013 |

(Continued)

OTHER PUBLICATIONS

Notice of Reasons for Rejection dated Mar. 29, 2016, issued in counterpart Japanese Patent Application No. 2015-038353, with English translation. (5 pages).

(Continued)

*Primary Examiner* — Benjamin O Dulaney
(74) *Attorney, Agent, or Firm* — Westerman, Hattori, Daniels & Adrian, LLP

(57) ABSTRACT

Provided is an image data processing server including: a user authenticating unit that authenticates a user of an imaging device; a permission issuing unit that issues, to a predetermined service, access permission to an account of the user in the image data processing server; an image receiving unit that receives image data transmitted from the imaging device; a request receiving unit that receives a request for data from the predetermined service; and a data transmitting unit that transmits, when the image data received from the imaging device exists, data related to the image data to an account of the user of the predetermined service.

13 Claims, 7 Drawing Sheets

(56) References Cited

U.S. PATENT DOCUMENTS

| | | | | |
|---|---|---|---|---|
| 2013/0125134 A1* | 5/2013 | Ota | | G06F 3/12 718/106 |
| 2013/0135643 A1* | 5/2013 | Nagasaki | | G06F 3/1211 358/1.13 |
| 2013/0188221 A1* | 7/2013 | Ohno | | G06F 3/1296 358/1.15 |
| 2013/0215459 A1* | 8/2013 | Iizuka | | G06K 15/007 358/1.15 |
| 2014/0002863 A1 | 1/2014 | Hasegawa et al. | | |
| 2014/0067882 A1* | 3/2014 | Ikeuchi | | G06Q 10/101 707/821 |
| 2014/0223536 A1* | 8/2014 | Matsushima | | H04L 67/10 726/11 |
| 2014/0293308 A1 | 10/2014 | Ishibashi | | |
| 2015/0015909 A1* | 1/2015 | Kaida | | G06F 21/608 358/1.14 |
| 2015/0029543 A1* | 1/2015 | Morita | | G06F 3/1236 358/1.15 |
| 2015/0106665 A1* | 4/2015 | Choh | | H04L 51/08 714/57 |
| 2015/0293732 A1* | 10/2015 | Kyoo | | G06F 21/608 358/1.14 |
| 2015/0350344 A1* | 12/2015 | Sugimura | | H04L 67/16 709/202 |
| 2016/0125174 A1* | 5/2016 | Matsushima | | G06Q 10/10 726/30 |
| 2016/0227073 A1* | 8/2016 | Omori | | H04N 1/4426 |

FOREIGN PATENT DOCUMENTS

| | | |
|---|---|---|
| JP | 2013-168803 A | 8/2013 |
| JP | 2013-207449 A | 10/2013 |
| JP | 2014-197820 A | 10/2014 |
| JP | 2014-199558 A | 10/2014 |

OTHER PUBLICATIONS

Office Action dated Sep. 7, 2018, issued in counterpart Chinese application No. 201510707552.0, with English translation. (14 pages).

Office Action dated Feb. 8, 2018, issued in counterpart Japanese Application No. 20150707552.0, with English translation (20 pages).

Office Action dated Feb. 8, 2018, issued in counterpart Chinese Application No. 201510707552.0, with English translation (20 pages).

\* cited by examiner

IMAGE DATA PROCESSING SERVER FOR STORING DEVICE IMAGE DATA AND FOR AUTHENTICATING USER AUTHORIZED SERVICES

CROSS-REFERENCE TO RELATED APPLICATION

This application is based upon and claims the benefit of priority of the prior Japanese Patent Application No. JP2015-038353, filed on Feb. 27, 2015, the entire contents of which are incorporated herein by reference.

FIELD

The present disclosure relates to a technique for processing image data.

BACKGROUND

In a conventionally proposed technique, an information processing device which is capable of communicating with a transmitting device that transmits data and a storage device that stores data and which provides a cloud service receives data transmitted from the transmitting device, transmits data with a same capacity as the received data to the storage device, performs processing of the cloud service on the received data, and transmits, together with processed data, an instruction to update data with the same capacity using the processed data, to the storage device (refer to Japanese Patent Application Publication No. 2013-168803).

In addition, an image reading device is proposed in which analog data that is output by each imaging element in an image sensor having read an image is converted into digital data and uncompressed data is generated, a margin pattern included in the image is detected based on the generated uncompressed data, a document type of the image is identified based on the detected margin pattern, the generated uncompressed data is developed to generate image data, document type data is attached to the generated image data, and the image data is output to a server. (Refer to Japanese Patent Application Publication No. 2013-207449).

Furthermore, an intermediary server is proposed which: acquires, from a multifunction machine, processing identification information for identifying a selection data process which is a data process executed with respect to output data that is image data output from the multifunction machine and which is at least one type of data process selected by the multifunction machine from a plurality of types of data processes; selects, among a plurality of types of modules that respectively execute the plurality of types of data processes, a module capable of executing the selection data process; causes the selected module to execute the selection data process on output data; causes the multifunction machine to acquire data processed by the selected module; and causes the multifunction machine to execute a printing process based on the processed data (refer to Japanese Patent Application Publication No. 2014-199558).

SUMMARY

An example of the present disclosure is an image data processing server including: user authenticating means for authenticating a user of an imaging device; permission issuing means for issuing, to a predetermined service that provides a service via a network, access permission to an account of the user in an image data processing server; image receiving means for receiving, via a network, image data which is transmitted from and acquired by the user-authenticated imaging device; request receiving means for receiving, from the predetermined service to which the access permission has been issued, a request for image data received from the imaging device used by the user or data generated based on the image data; and data transmitting means for transmitting, when the image data received from the imaging device used by the user exists, the image data or data generated based on the image data to an account of the user of the predetermined service in accordance with the request.

The present disclosure may be viewed as an information processing device, a system, a method that is executed by a computer, and a program to be executed by a computer.

In addition, the present disclosure may be viewed as a recording of such a program on a recording medium that is readable by a device such as a computer, a machine, or the like.

In this case, a recording medium that is readable by a computer or the like refers to a recording medium which stores information such as data and programs by an electric action, a magnetic action, an optical action, a mechanical action, or a chemical action and which can be read by a computer or the like.

DESCRIPTION OF EMBODIMENTS

Hereinafter, an embodiment of an image data processing server, a system, a method, and a program according to the present disclosure will be described with reference to the drawings. It should be noted that the embodiment described below merely exemplifies the present disclosure and is not intended to limit an image data processing server, a system, a method, and a program according to the present disclosure to the specific configurations described below. When implementing the present disclosure, a specific configuration may be adopted as appropriate in accordance with each embodiment. In addition, various improvements and modification may be made to the present disclosure.

As the present embodiment, an embodiment in which an image data processing server, a system, a method, and a program according to the present disclosure are implemented in a system that is interlocked with a scanner will be described. However, an image data processing server, a system, a method, and a program according to the present disclosure can be widely used with respect to techniques for processing image data acquired by an imaging device.

Accordingly, objects of application of the present disclosure are not limited to the examples described in the present embodiment.

<Configuration of System>

Figure 1:
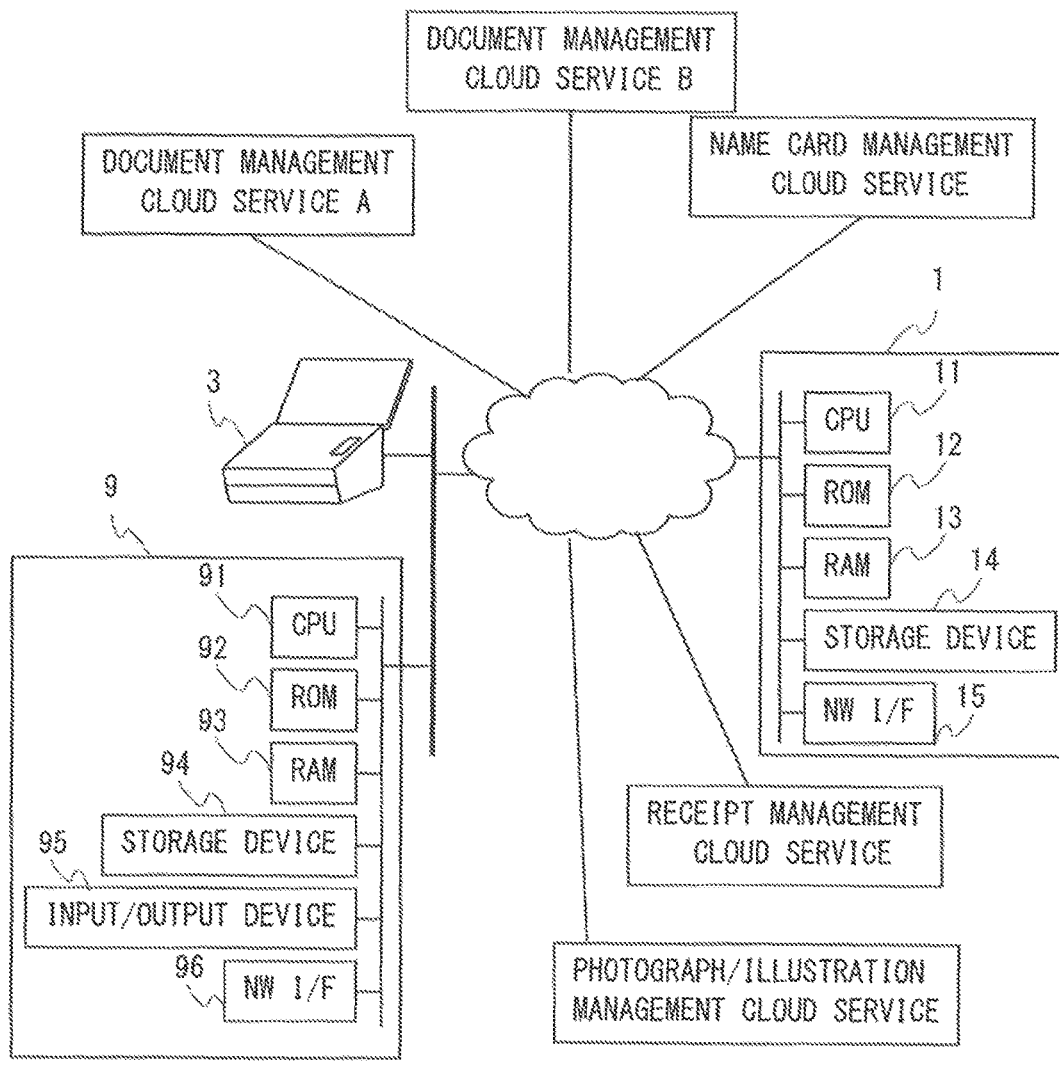
FIG. 1 is a schematic diagram showing a configuration of a system according to an embodiment.

FIG. 1 is a schematic diagram showing a configuration of a system 1 according to the present embodiment. The system 1 according to the present embodiment includes a scanner 3 and an image data processing server 1 which are connected via a network such as the Internet or a wide area network.

The image data processing server 1 is a computer including a central processing unit (CPU) 11, a read only memory (ROM) 12, a random access memory (RAM) 13, a storage device 14 that is an electrically erasable and programmable read only memory (EEPROM), an hard disk drive (HDD), or the like, a communicating unit 15, and the like. Moreover, while the image data processing server 1 is shown in the drawing to be a computer housed in a single case for the sake of simplicity, in the present embodiment, the image data processing server 1 provides an image data processing service to a user by having a part of or all of its functions executed by a device installed at a remote location or a plurality of devices installed in a distributed manner using cloud technology or the like. However, the configuration of the image data processing server 1 is not limited to the configuration exemplified in the present embodiment.

Figure 2:
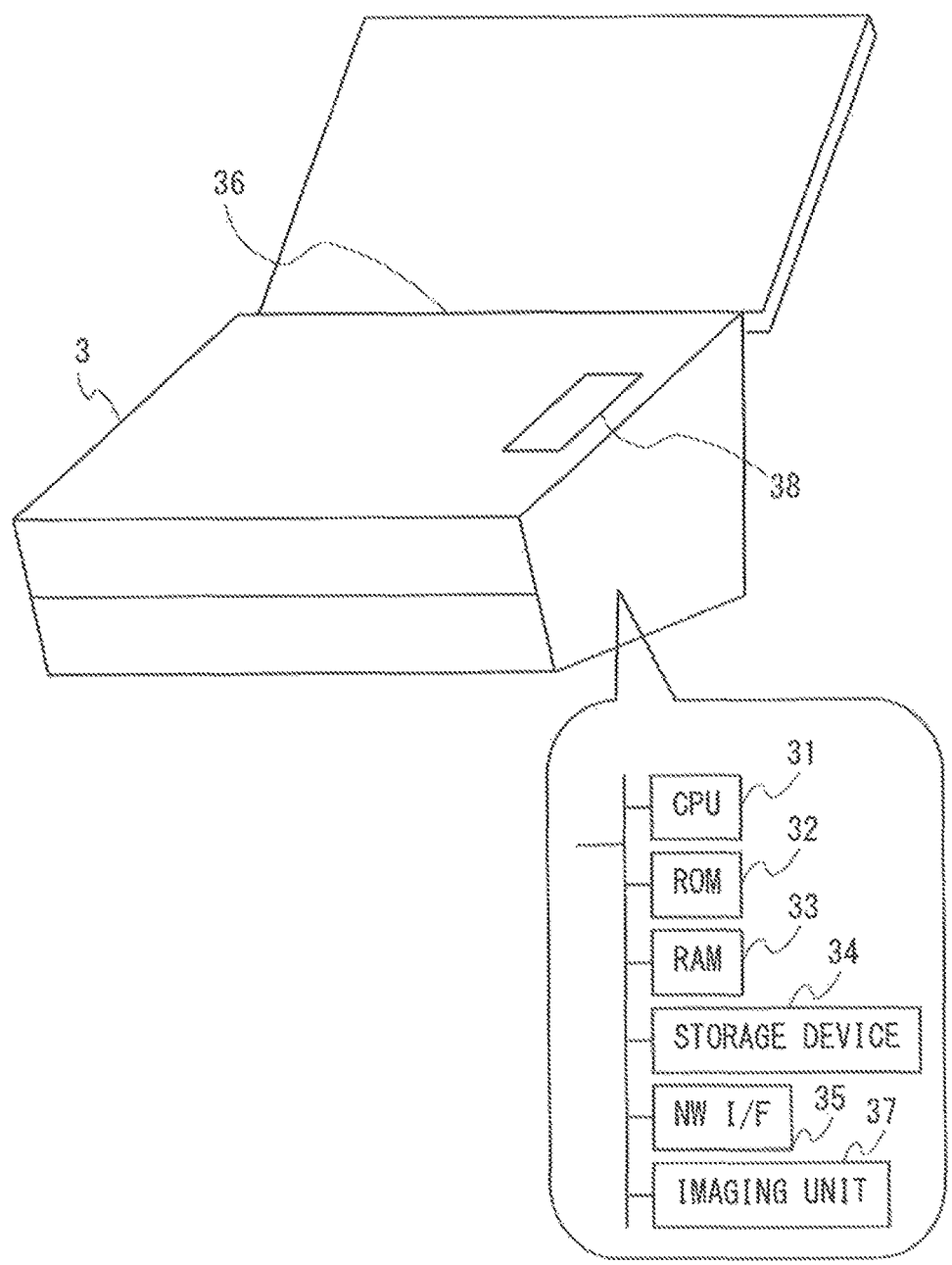
FIG. 2 is a diagram showing a hardware configuration of a scanner according to an embodiment.

FIG. 2 is a diagram showing a hardware configuration of the scanner 3 according to the present embodiment. The scanner 3 is a device which acquires image data by capturing an image of an original document such as a document, a name card, a receipt, and a photograph/illustration set by the user and is an imaging device including a sheet feeder 36 that feeds an original document to an imaging unit 37, the imaging unit 37, a scan button 38, a CPU 31, a ROM 32, a RAM 33, a storage device 34, a communicating unit 35, and the like. Moreover, while a scanner 3 adopting an image system in which images of an original document set in the sheet feeder 36 are captured while the original document is being automatically fed is exemplified in the present embodiment, the imaging system of a scanner is not restrictive. For example, a scanner of a type in which an image of an original document set at a reading position by the user may be used. In addition, while an example of using the scanner 3 as an imaging device to be used in the present system will be described in the present embodiment, the imaging device to be used in the present system is not limited to a scanner. For example, a camera may be adopted as the imaging device.

The scanner 3 according to the present embodiment is capable of connecting to a wireless LAN due to being provided with a wireless communication function. In addition, while the scanner 3 according to the present embodiment includes the scan button 38 that is pressed or touched by the user to instruct the scanner 3 to capture an image, the scanner 3 does not include a user interface that enables character input/output and item selection such as a touch panel display and a keyboard nor does the scanner 3 include a web browser function and a server function. However, communicating means, hardware configuration, and the like of a scanner capable of adopting the method according to the present embodiment is not limited to those exemplified in the present embodiment.

In addition, a user terminal 9 such as a so-called smartphone, a tablet, and a personal computer is connected to the system according to the present embodiment. The user terminal 9 is a computer including a CPU 91, a ROM 92, a RAM 93, a storage device 94, an input/output device 95, a communicating unit 96, and the like. As shown in FIG. 1, the user terminal 9 may communicate with the scanner 3 and the image data processing server 1 by being connected to a local network to which the scanner 3 is connected or may communicate with the scanner 3 and the image data processing server 1 by being connected to a mobile phone network.

Furthermore, an application for using the system according to the present embodiment has been downloaded to and installed in the user terminal 9 in advance. The application enables settings and the like to be made on the scanner 3 via the network. Therefore, a user interface that enables character input/output and item selection such as a touch panel display and a keyboard can be omitted from the scanner 3 according to the present embodiment. In addition, the application enables accounts to be created, login and logout to be performed, settings to be made, and the like on the image data processing server 1 via the network. As a result, with the system according to the present embodiment, by simply operating the user terminal 9 to complete preparations related to the entire system, setting an original document on the scanner 3, and operating the scan button 38, the user can transmit data obtained from the original document to an appropriate cloud service.

In addition, the image data processing server 1 and the user terminal 9 are capable of communicating with a plurality of cloud services (including services provided by third parties) on the Internet which provide various services to the user. Moreover, while hardware configurations of cloud services other than the image data processing server 1 are not illustrated in FIG. 1, each of the cloud services features computers with the same hardware configuration as the image data processing server 1 being installed in a distributed manner using cloud technology. While examples of these cloud services include a document management service, a name card management service, a receipt management service, and a photograph/illustration management service, cloud services that can be interlocked with the system 1 according to the present embodiment are not limited to those exemplified in the present disclosure.

Figure 3:
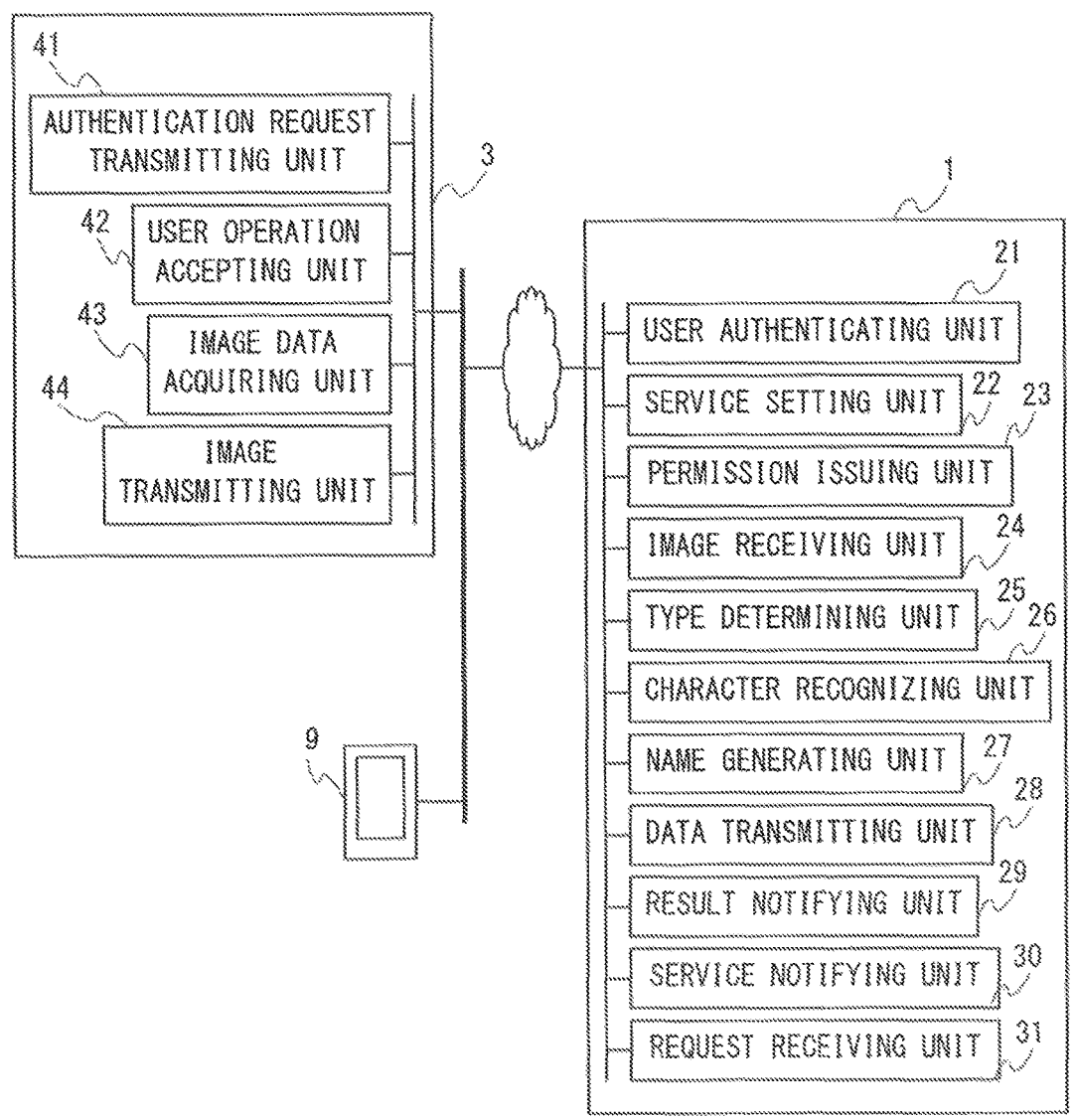
FIG. 3 is a diagram schematically showing a functional configuration of a system according to an embodiment.

FIG. 3 is a diagram schematically showing a functional configuration of the system according to the present embodiment. As respective hardware included in the image data processing server 1 are controlled by having a program recorded in the storage device 14 read by the RAM 13 and executed by the CPU 11, the image data processing server 1 functions as a device that includes a user authenticating unit 21, a service setting unit 22, a permission issuance unit 23, an image receiving unit 24, a type determining unit 25, a character recognizing unit 26, a name generating unit 27, a data transmitting unit 28, a result notifying unit 29, a service notifying unit 30, and a request receiving unit 31. Moreover, in the present embodiment, the respective functions of the image data processing server 1 are executed by the CPU 11 that is a general purpose processor. Alternatively, a part of or all of the functions may be executed by one or a plurality of dedicated processors.

In response to an authentication request transmitted from the user terminal 9 or the scanner 3, the user authenticating unit 21 authenticates the user of the user terminal 9 or the scanner 3. The authentication request includes authentication information necessary for authentication. In the present embodiment, while a user ID and a password are used as authentication information, other information may be used as authentication information. Moreover, since the scanner 3 according to the present embodiment does not include a user interface that enables character input/output and item selection as described earlier, an authentication request is transmitted to the image data processing server 1 using authentication information, the notification of which is issued from the user terminal 9 to the scanner 3.

In the present embodiment, an access token (hereinafter, referred to as an "image data processing server access token" to distinguish the access token from a cloud service access token to be described later) is used to authenticate the user. Upon receiving an authentication request from the user terminal 9 or the scanner 3, the user authenticating unit 21 verifies authentication information included in the authentication request, and when the authentication information is appropriate, transmits an image data processing server access token to a transmission source of the authentication request (the user terminal 9 or the scanner 3). The user terminal 9 or the scanner 3 having received the image data processing server access token subsequently communicates with the image data processing server 1 using the image data processing server access token.

The service setting unit 22 sets a cloud service specified by the user as a transmission destination of image data and the like when the image data is of a predetermined type as a predetermined cloud service. In other words, with the image data processing server 1 according to the present embodiment, a data transmission destination cloud service in a case where image data is image data of a predetermined type can be set as a cloud service desired by the user. For example, when there are a plurality of document management services (for example, the document management service A and the document management service B shown in FIG. 1), by specifying a desired document management cloud service to the image data processing server 1 via an application that runs on the user terminal 9, the user can set a cloud service to be a transmission destination of data in a case where image data is document image data as a document management service that is specified by the user. This also applies to cloud services that manage data related to image data of other types or, in other words, to a name card management service, a receipt management service, and a photograph/illustration management service.

In response to an access permission request transmitted from a predetermined cloud service, the permission issuing unit 23 issues an access permission to a user account in the image data processing server 1 to the predetermined cloud service. Herein, in the present embodiment, the predetermined cloud service transmits an access permission request upon receiving an instruction issued by the user-authenticated user terminal 9.

In the present embodiment, OAuth 2.0 authentication is used as means by which a cloud service receives access permission from the image data processing server 1, and an access token (hereinafter, referred to as a "cloud service access token" to distinguish the access token from the image data processing server access token described earlier) is used as access permission. The image data processing server 1 issues an access token for cloud service to each cloud service set by the service setting unit 22 among the cloud services that are interlocked with the present system. The issued access token for each cloud service is associated with an account of the user in the image data processing server 1 and saved in the image data processing server 1.

The image receiving unit 24 receives, via the network, image data which is acquired by and transmitted from the user-authenticated scanner 3.

The type determining unit 25 determines a type of the received image data. Moreover, in the present embodiment, the type that is determined by the type determining unit 25 includes at least any of a document, a name card, a receipt, and a photograph/illustration. However, the type of image data that can be determined by the type determining unit 25 is not limited to the types exemplified in the present embodiment.

The character recognizing unit 26 performs optical character recognition (OCR) on image data.

The name generating unit 27 generates a name of image data or data generated based on the image data, using a character string obtained as a result of optical character recognition. As the name of data, for example: when the determination by the type determining unit 25 reveals that the type of image data is a document, the name generating unit 27 generates a character string including a title and a creation date of the document; when the determination by the type determining unit 25 reveals that the type of image data is a name card, the name generating unit 27 generates a character string including a name and an organization name; and when the determination by the type determining unit 25 reveals that the type of image data is a receipt, the name generating unit 27 generates a character string including a store name and a received date.

The request receiving unit 31 receives, from the predetermined cloud service having been issued access permission, a request for the image data or data generated based on the image data. When a data request is issued by the cloud service, an access token that is saved in the image data processing server 1 in association with an account of a user who has been authenticated by the user authenticating unit 21 as the user of the scanner 3 having transmitted the image data is used among the respective cloud service access tokens which have been issued by the permission issuing unit 23 and which have been acquired by the respective cloud services.

When the type determining unit 25 determines that image data is of a predetermined type and the request receiving unit 31 receives a request, the data transmitting unit 28 transmits the image data or data generated based on the image data (hereinafter, simply referred to as "data") to a user account of a predetermined cloud service. In other words, even when a request for data is received from the predetermined cloud service, the data transmitting unit 28 does not transmit data if the image data is not image data of a type that is handled by the predetermined cloud service having transmitted the request.

Accordingly, when the type determining unit 25 determines that image data is document image data, the data transmitting unit 28 can transmit the image data or data generated based on the image data to a user account of a document management service specified by the user.

The result notifying unit 29 notifies the user of a result (completion, failure, and the like) of data transmission by the data transmitting unit 28 by performing a release result notification.

The service notifying unit 30 notifies the user terminal 9 of the predetermined cloud service.

As respective hardware included in the scanner 3 are controlled by having a program recorded in the storage device 34 read by the RAM 33 and executed by the CPU 31, the scanner 3 functions as a device that includes an authentication request transmitting unit 41, a user operation accepting unit 42, an image data acquiring unit 43, and an image transmitting unit 44. Moreover, in the present embodiment, the respective functions of the scanner 3 are executed by the CPU 31 that is a general purpose processor. Alternatively, a part of or all of the functions may be executed by one or a plurality of dedicated processors.

The authentication request transmitting unit 41 transmits, to the image data processing server 1, an authentication request including authentication information, the notification of which is issued from the user terminal 9 to the scanner 3.

The user operation accepting unit 42 accepts a predetermined user operation. In the present embodiment, as the predetermined user operation, pressing or touching the scan button 38 provided on the scanner 3 is accepted as a user operation for collectively instructing a series of processes from starting a scan to transmitting data to an appropriate cloud service. However, the predetermined user operation that triggers a scan to start is not limited to the example according to the present disclosure.

When the predetermined user operation is accepted by the user operation accepting unit 42, the image data acquiring unit 43 acquires image data by capturing an image of an object. Specifically, when an operation of the scan button 38 is accepted by the user operation accepting unit 42, the image data acquiring unit 43 of the scanner 3 according to the present embodiment acquires image data of an original document by controlling the sheet feeder 36 to send the original document to the imaging unit 37 and then controlling the imaging unit 37 to capture an image of the original document.

The image transmitting unit 44 transmits the image data acquired by the image data acquiring unit 43 to the image data processing server 1 via the network. In addition, transmission of image data by the image transmitting unit 44 is executed following the acquisition of the image data without involving operations other than the predetermined user operation (in the present embodiment, an operation of the scan button 38).

<Flow of Processes>

Next, a flow of processes executed by the system 1 according to the present embodiment will be described. It is to be understood that specific contents and a specific sequence of processes described below merely represent one example of implementing the present disclosure. Specific contents and sequences of the processes may be appropriately selected in accordance with embodiments of the present disclosure.

Figure 4:
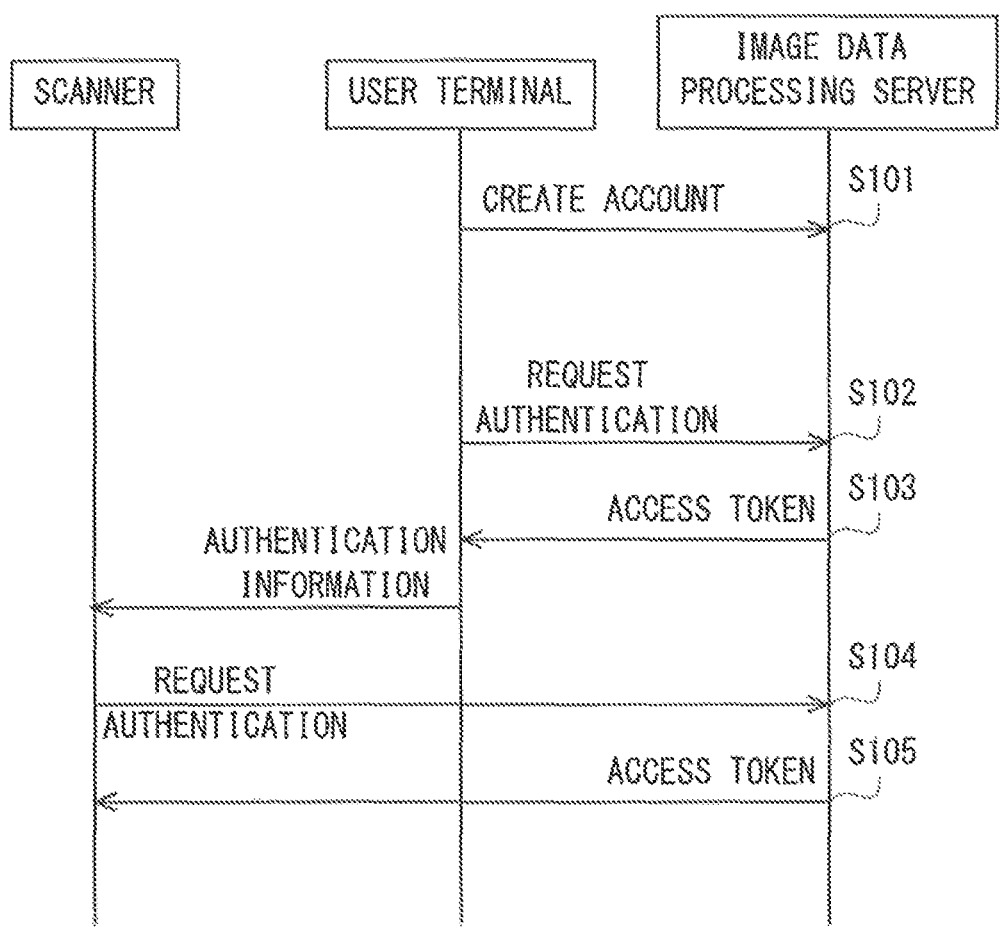
FIG. 4 is a sequence diagram showing an outline of a flow of an account creation/user authentication process according to an embodiment.

FIG. 4 is a sequence diagram showing an outline of a flow of an account creation/user authentication process according to the present embodiment.

In step S101, a user account is created. The user starts an application on the user terminal 9 that is a smartphone or the like. The started application prompts the user to input information (such as a user ID and a password) which is required to create an account and transmits the information input by the user to the image data processing server 1. The image data processing server 1 determines whether or not the information received from the user terminal 9 is appropriate, and when it is determined that the information is appropriate, creates an account of the user. In addition, the application saves authentication information (in the present embodiment, a user ID and a password) for logging into the created user account, in the user terminal 9.

In steps S102 and S103, a login process to the image data processing server 1 is performed by the user terminal 9. In response to an authentication request transmitted from the user terminal 9, the user authenticating unit 21 authenticates the user of the user terminal 9. Specifically, upon receiving an authentication request from the user terminal 9 (step S102), the user authenticating unit 21 verifies authentication information that is included in the authentication request, and when the authentication information is consistent with the account information created in step S101, the user authenticating unit 21 transmits an image data processing server access token to the user terminal 9 that is a transmission source of the authentication request (step S103). The user terminal 9 having received the image data processing server access token subsequently communicates with the image data processing server 1 using the received access token.

In addition, after creating an account in the image data processing server 1, an application of the user terminal 9 connects the user terminal 9 to the scanner 3 via a wireless network. Furthermore, the application notifies the scanner 3 of the authentication information which is created in step S101 and saved in the user terminal 9 and which is used to log into the image data processing server 1. The authentication request transmitting unit 41 of the scanner 3 having received the notification of the authentication information transmits an authentication request including the authentication information to the image data processing server 1.

In steps S104 and S105, a login process to the image data processing server 1 is performed by the scanner 3. When the authentication request transmitted by the scanner 3 is received by the image data processing server 1 (step S104), the user authenticating unit 21 of the image data processing server 1 authenticates the user of the scanner 3. The user authenticating unit 21 verifies the authentication information included in the authentication request that is received from the scanner 3, and when the authentication information is consistent with the account information created in step S101, the user authenticating unit 21 transmits an image data processing server access token to the scanner 3 that is a transmission source of the authentication request (step S105). The scanner 3 having received the image data processing server access token subsequently communicates with the image data processing server 1 using the received access token.

Figure 5:
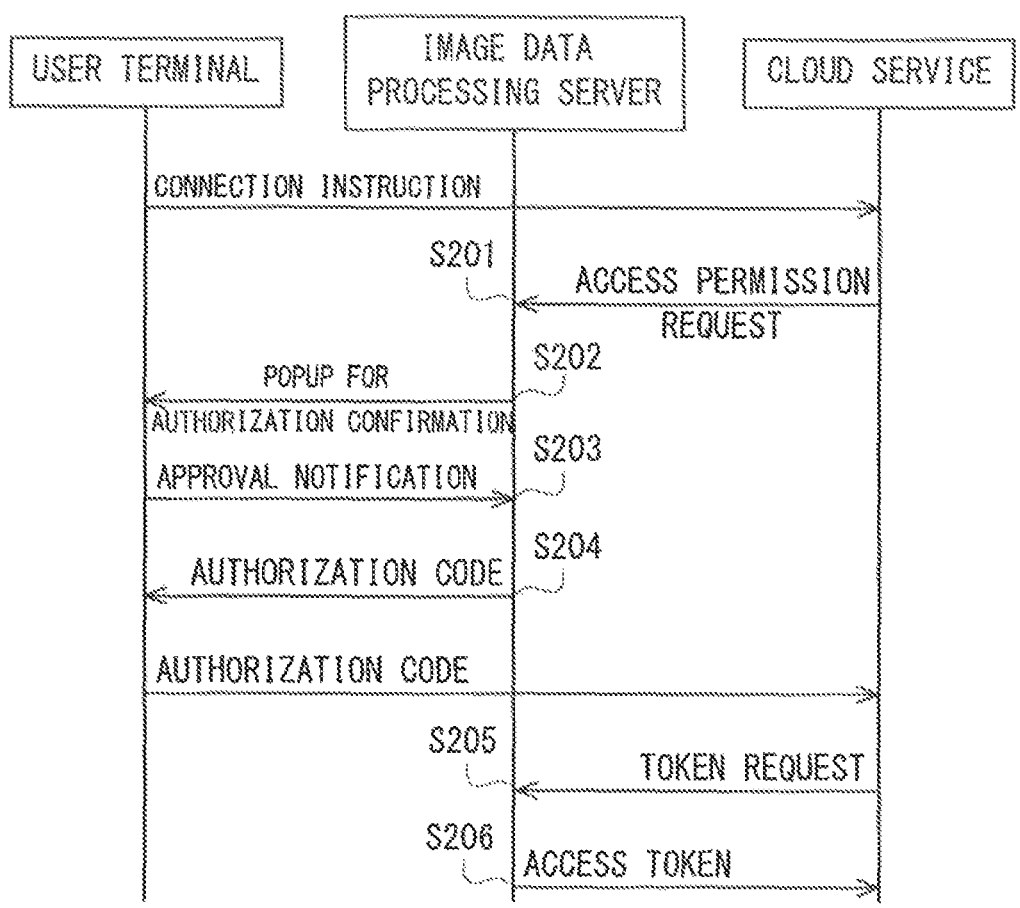
FIG. 5 is a sequence diagram showing an outline of a flow of a permission issuance process according to an embodiment.

FIG. 5 is a sequence diagram showing an outline of a flow of a permission issuance process according to the present embodiment. Execution of the permission issuance process according to the present embodiment is triggered by the start of an application for using the system according to the present embodiment by the user. Moreover, while OAuth 2.0 authentication is used as means for issuing access permission to a cloud service in the present embodiment, other means may alternatively be used for the authentication.

In step S201, an access permission request is received. By starting an application on the user terminal 9 and operating an agent of the application, the user connects the user terminal 9 to a website provided by the cloud service. Moreover, while a web browser that is implemented in the application is used as the agent in the present embodiment, other web browsers that are installed in the user terminal 9 may alternatively be used to connect to the website provided by the cloud service.

In addition, when the website of the cloud service receives a connection instruction (for example, an operation of a "link with image data processing server" button) to the image data processing server 1 which is issued by the user via the web browser, the cloud service transmits an access permission request to the image data processing server 1. The access permission request represents a request made by an account of the user of the cloud service for using an account of the user in the image data processing server 1. Moreover, a user account of each cloud service may be set in advance by the user or may be newly created via an application. The access permission request transmitted from the cloud service is received by the image data processing server 1. Subsequently, the process proceeds to step S202.

In steps S202 and S203, approval by the user is acquired. The image data processing server 1 having received the access permission request displays a popup for authorization confirmation on the user terminal 9 (step S202). Subsequently, when the user having confirmed the displayed popup performs an operation for approving (granting) the use of the account of the user in the image data processing server 1 related to the popup by the cloud service, the image data processing server 1 is notified of the approval by the user from the web browser (step S203). Subsequently, the process proceeds to step S204.

In step S204, the image data processing server 1 having received the notification of the user's approval provides an authorization code to the cloud service via the web browser of the user terminal 9. The cloud service receives, via the user terminal 9, the authorization code transmitted by the image data processing server 1. Subsequently, the process proceeds to step S205.

In steps S205 and S206, a cloud service access token is issued. The cloud service transmits an access token request including the authorization code to the image data processing server 1 and the image data processing server 1 receives the access token request (step S205). In addition, the permission issuing unit 23 of the image data processing server 1 issues an access token in exchange for the authorization code (step S206). Moreover, as described earlier, the user can specify a desired cloud service for each type of image data. The permission issuing unit 23 issues an access token to the cloud service specified by the user. The issued access token is acquired by the cloud service. In addition, the issued access token for each cloud service is associated with the user account in the image data processing server 1 and saved in the image data processing server 1. Subsequently, the process shown in the present sequence diagram is finished.

As a result of the processes shown in FIGS. 4 and 5 described above, an access token for the image data processing server 1 is acquired by the scanner 3, the access token for the image data processing server 1 is acquired by the cloud service, and user accounts thereof are associated with each other. Therefore, with the system according to the present embodiment, a transmission (release) of scan data from the scanner 3 to the cloud service via the image data processing server 1 can be performed as will be described later with reference to FIG. 6.

Figure 6:
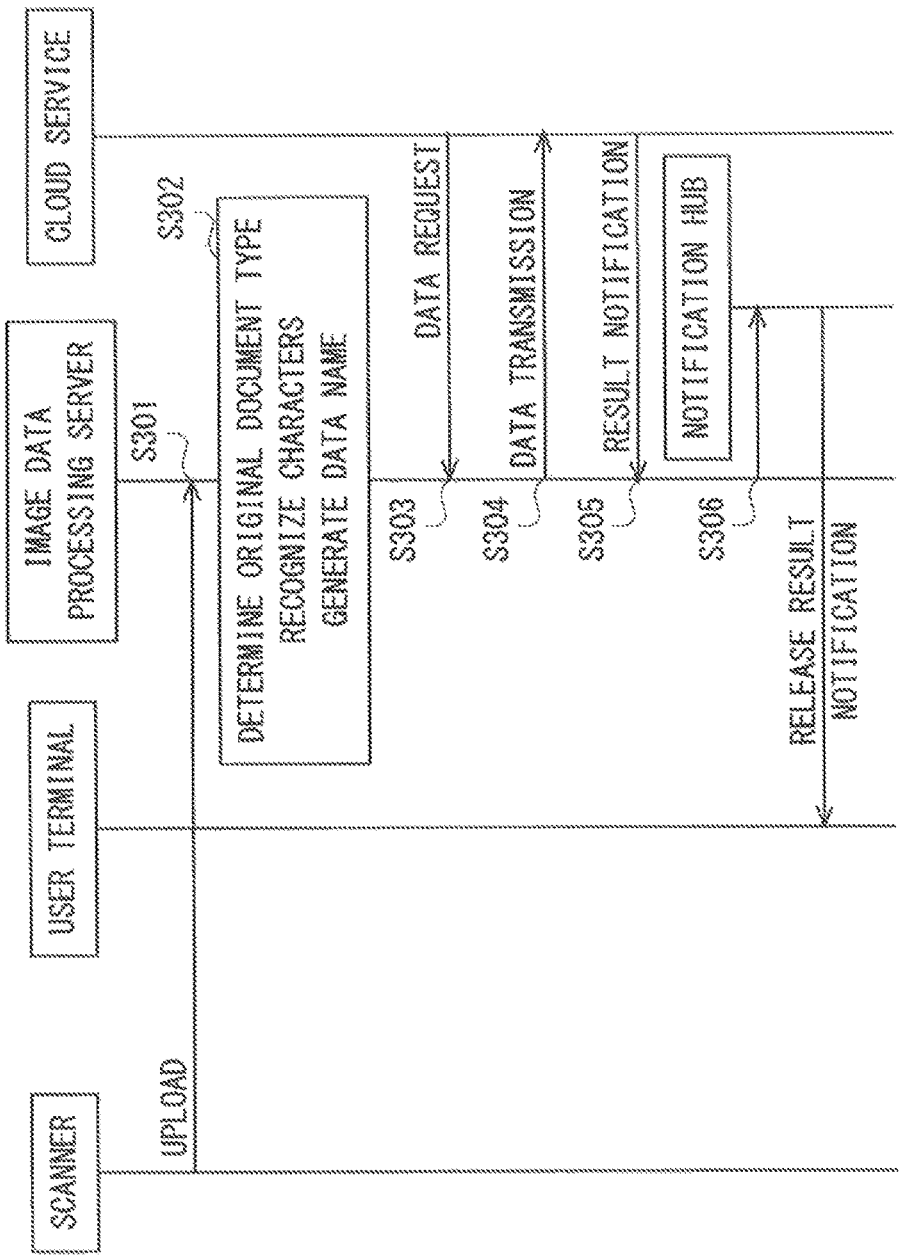
FIG. 6 is a sequence diagram showing an outline of a flow of an image data process according to an embodiment.

FIG. 6 is a sequence diagram showing an outline of a flow of an image data process according to the present embodiment. Execution of the image data process according to the present embodiment is triggered by the mounting of an original document on the scanner 3 and the user operating the scan button 38 of the scanner 3.

In step S301, scanned image data is uploaded to the image data processing server 1. When an operation of the scan button 38 is accepted by the user operation accepting unit 42 of the scanner 3, the image data acquiring unit 43 acquires image data of the original document by sending the original document to the imaging unit 37 using the sheet feeder 36 and causing the imaging unit 37 to capture an image of the original document. In addition, the image transmitting unit 44 of the scanner 3 transmits the acquired image data to the image data processing server 1. In this case, the image data processing server access token acquired in advance in step S105 is used for the transmission.

In addition, transmission of image data by the image transmitting unit 44 in the present embodiment is executed following the acquisition of the image data without involving user operations other than an operation of the scan button 38. The image receiving unit 24 of the image data processing server 1 receives image data transmitted from the scanner 3. In addition, by inspecting an access token that is received together with the image data, the image receiving unit 24 confirms whether or not the received image data has been transmitted from a user-authenticated scanner 3. When the received image data has not been received from a user-authenticated scanner 3, the process shown in the present sequence diagram is finished (not illustrated). On the other hand, when the received image data has been received from a user-authenticated scanner 3, the process proceeds to step S302.

In step S302, automatic discrimination of original document type is performed. The type determining unit 25 determines whether the received image data is image data related to any type of a document, a name card, a receipt, and a photograph/illustration. While a determination system based on image characteristics such as layout recognition, character recognition, and color recognition can be used to determine the type, the determination system is not limited to the example described in the present disclosure and various techniques including known techniques as well as techniques to be developed in the future can be adopted to determine the type.

In addition, the character recognizing unit 26 performs optical character recognition (OCR) on the image data. Furthermore, the name generating unit 27 generates a name of image data or data generated based on the image data, using a character string acquired as a result of the optical character recognition. A specific method of name generation is as described earlier. Moreover, the image data is not limited to a data format received from the scanner and may be converted into a format suitable for the determined original document type such as Portable Document Format (PDF). Subsequently, the process proceeds to step S303.

In step S303, a data request is received. The request receiving unit 31 receives a request for data from a predetermined cloud service to which access permission has been issued. For the data request by the cloud service, each cloud service access token which is issued in step S206 and which is acquired by each cloud service is used. Specifically, for example, the cloud service issues a data request by calling a capture application programming interface (API) that is provided as a web API by the image data processing server 1. In other words, in the system according to the present embodiment, data is acquired by the cloud service by performing a pull process. Alternatively, the cloud service may issue a data request by so-called polling in which a request for data is periodically issued or by so-called long polling in which a data requesting state is continued by setting a longer period until a data request times out.

In addition, by inspecting an access token that is received together with the data request, the request receiving unit 31 confirms whether or not the received data request has been transmitted from a cloud service that is approved by the user. Specifically, the inspection of an access token may be performed by collating the access token which is issued in step S206 and which is saved in association with a user account and the access token received in step S303 with each other. When the received data request has not been transmitted from a cloud service that is approved by the user, the process shown in the present sequence diagram is finished (not illustrated). On the other hand, when the received data request has been transmitted from a cloud service that is approved by the user, the process proceeds to step S304.

In step S304, a cloud service corresponding to the original document type is identified and data is transmitted to the concerned cloud service. When image data received from the scanner 3 exists, in response to the request received in step S303 and in accordance with the original document type determined in step S302, the data transmitting unit 28 transmits the image data or data generated based on the image data as well as the generated name to a user account of the cloud service corresponding to the original document type. The user account that is the destination of data at this point is an account of the user of the scanner 3 having captured the image data. Subsequently, the process proceeds to step S305.

In steps S305 and S306, a release result is transmitted. When data transmission by the data transmitting unit 28 is completed and a result notification is received from the cloud service that is a transmission destination (step S305), the result notifying unit 29 of the image data processing server 1 notifies the user of completion, failure, or the like of the data transmission by performing a release result notification (step S306).

Specifically, the result notifying unit 29 notifies a notification function or an application provided in the user terminal 9 as a standard feature that data has been transmitted to a predetermined cloud service and is saved in the cloud service via a predetermined notification hub service (for example, the Azure notification hub) which enables a push notification to be issued to the user terminal 9. However, other techniques may be adopted in order to issue the result notification. Subsequently, the process shown in the present sequence diagram is finished.

Figure 7:
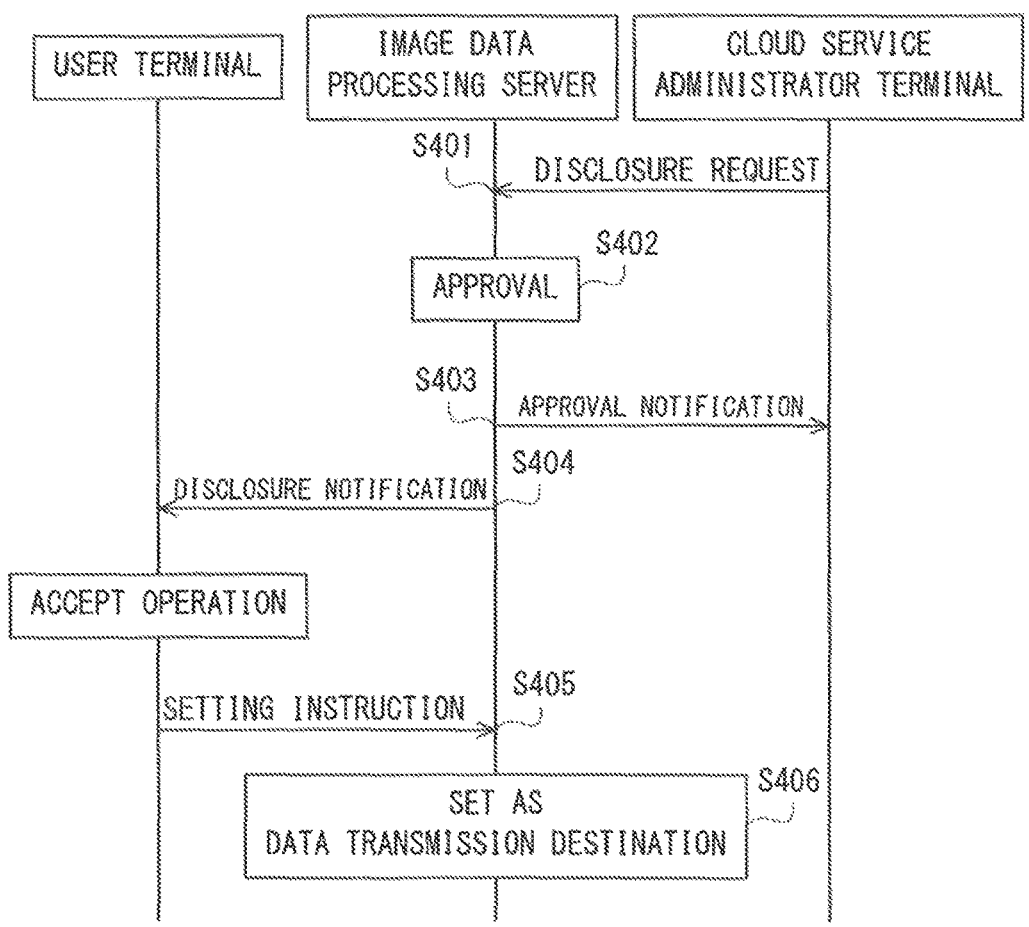
FIG. 7 is a sequence diagram showing an outline of a flow of a service addition process according to an embodiment.

FIG. 7 is a sequence diagram showing an outline of a flow of a service addition process according to the present embodiment. Execution of the service addition process according to the present embodiment is triggered by a transmission of a disclosure request from a terminal used by an administrator of a cloud service. In this case, a disclosure request refers to a request for disclosing a predetermined cloud service as an option of a cloud services that can be specified by the user and includes information for determining whether or not the cloud service should be approved (for example, information on a provider of the cloud service).

In steps S401 to S403, disclosure of a new cloud service is approved. When the image data processing server 1 receives a disclosure request transmitted from a terminal used by an administrator of a cloud service (step S401), the image data processing server 1 performs an approval process (step S402). Execution of the approval process is triggered by, for example, a notification of contents of the disclosure request including information on a provider of the cloud service and the like to an administrator of the image data processing server 1 and by performance of an approval operation by the administrator of the image data processing server 1. However, a specific method of approving a disclosure request is not limited to the example described in the present embodiment and various methods may be adopted. Once the disclosure request is approved, the terminal of the administrator of the cloud service is notified of the approval. Subsequently, the process proceeds to step S404.

In step S404, the user terminal 9 is notified of the approved cloud service. The service notifying unit 30 of the image data processing server 1 notifies the user terminal 9 of the cloud service approved in step S402. The user terminal having received the notification adds the notified cloud service to options of cloud services that can be set from an application. Subsequently, via the application, the user can specify the notified cloud service as a transmission destination of image data and the like when the image data is of a predetermined type. In other words, according to the system disclosed in the present embodiment, by simply transmitting a disclosure request and receiving approval thereof, the administrator of the cloud service can start providing the user with a data transmission function with respect to the cloud service. Subsequently, when an operation by the user for specifying the notified cloud service as a transmission destination of image data of a predetermined type and the like is accepted, the process proceeds to step S405.

In steps S405 and S406, the approved cloud service is set as a data transmission destination. The image data processing server 1 receives an instruction for using the notified cloud service from the user terminal 9 having received the notification in step S404 (step S405). In addition, the service setting unit 22 of the image data processing server 1 performs a setting for adding a user account of the cloud service to transmission destinations of data by the data transmitting unit 28 (step S406). Therefore, when the image data process shown in FIG. 6 is subsequently executed, if image data received from the scanner 3 is image data of the predetermined type, data is transmitted to the cloud service. Subsequently, the process shown in the present flow chart is finished.

<Advantageous Effects>

As described above, in the system according to the present embodiment, when the image data processing server 1 receives a data request from a cloud service and, at the same time, image data received from the scanner 3 is present in the image data processing server 1, data related to the image data is transmitted to a user account of the cloud service. Therefore, with the system according to the present embodiment, regardless of differences in specifications of respective cloud services, data can be readily transmitted to the cloud services.

In addition, by being configured as described above, the system according to the present embodiment enables processes from reception of image data by the image receiving unit 24 to transmission of the image data or data generated based on the image data by the data transmitting unit 28 to be consecutively executed without involving confirmation by a user, and realizes a system in which a series of processes from start of a scan to completion of transmission of data to an appropriate cloud service is completed by a single operation (one push or one touch of the scan button 38) without having to specify a cloud service that is a transmission destination.

What is claimed is:

1. An image data processing server comprising:
a processing circuitry configured to authenticate a user of an imaging device;
the processing circuitry configured to generate an access token for accessing an account of the user in an image data processing server and issue the access token to an external service provided by a third party that provides a service via a network;
an image receiver to receive, via a network, image data which is acquired by and transmitted from the imaging device which is user-authenticated;
the processing circuitry configured to determine a type of the received image data;
a request receiver to receive, from the external service to which the access token has been issued, a request for image data received from the imaging device used by the user or data generated based on the image data; and
a data transmitter to transmit, when the image data received from the imaging device used by the user exists, the image data or data generated based on the image data to an account of the user of the external service in accordance with the request, wherein the processing circuitry issues, to a first external service that provides a service via a network, access permission to an account of the user in the image data processing server and issues, to a second external service that provides a service via a network, access permission to an account of the user in the image data processing server, when the processing circuitry determines that the image data is image data of a first type and the request receiver receives the request from the first external service, the data transmitter uses the access permission issued to the first external service with respect to a user authenticated as a user of the imaging device having transmitted the image data to transmit the image data or data generated based on the image data to the account of the user in the image data processing server, and when the processing circuitry determines that the image data is image data of a second type and the request receiver receives the request from the second external service, the data transmitter uses the access permission issued to the second external service with respect to a user authenticated as a user of the imaging device having transmitted the image data to transmit the image data or data generated based on the image data to the account of the user in the image data processing server, and after the external service transmits an access token request including an authorization code to the image data processing server, the image data processing server generates the access token and issues the access token in exchange for the authorization code to the external service, and the external service receives the access token generated by the image data processing server.

2. The image data processing server according to claim 1, wherein
when the processing circuitry determines that the image data is image data of a predetermined type and the request receiver receives the request, the data transmitter transmits the image data or data generated based on the image data to the account of the user of the external service.

3. The image data processing server according to claim 2, further comprising the processing circuitry configured to set, upon receiving an instruction for using the external service from a user terminal, the account of the user of the external service as a transmission destination of data by the data transmitter.

4. The image data processing server according to claim 3, further comprising the processing circuitry configured to notify a user terminal, which is used by said user, of the external service, wherein
the processing circuitry sets, upon receiving an instruction for using the external service from the user terminal having received a notification by the processing circuitry, the account of the user of the external service as a transmission destination of data by the data transmitter.

5. The image data processing server according to claim 3, wherein
the processing circuitry sets, as the external service, a service specified by the user as a transmission destination of image data when the image data is image data of the predetermined type.

6. The image data processing server according to claim 2, wherein
the type that is determined by the processing circuitry includes at least any of a document, a name card, a receipt, and a photograph/illustration.

7. The image data processing server according to claim 1, wherein
the processing circuitry authenticates a user of the imaging device in response to an authentication request which is transmitted by the imaging device and which includes authentication information, a notification of which is issued from a user terminal to the imaging device.

8. The image data processing server according to claim 1, wherein
the processing circuitry further authenticates a user of a user terminal, and
the processing circuitry issues, upon receiving an access token request transmitted from the external service having received an instruction by the user terminal which is user-authenticated, the access token to the external service.

9. The image data processing server according to claim 1, further comprising the processing circuitry configured to notify the user of a result of data transmission by the data transmitter.

10. The image data processing server according to claim 1, further comprising:
the processing circuitry configured to perform optical character recognition on the image data; and
the processing circuitry configured to generate a name of the image data or data generated based on the image data, using a character string that is acquired as a result of the optical character recognition.

11. A system comprising:
an imaging device; and
an image data processing server, wherein
the image data processing server includes:
a processing circuitry configured to authenticate a user of the imaging device;
the processing circuitry configured to generate an access token for accessing an account of the user in an image data processing server and issue the access token to an external service provided by a third party that provides a service via a network;
an image receiver to receive, via a network, image data which is transmitted from and acquired by the imaging device which is user-authenticated;
the processing circuitry configured to determine a type of the received image data;
a request receiver to receive, from the external service to which the access token has been issued, a request for image data received from the imaging device used by the user or data generated based on the image data; and
a data transmitter to transmit, when the image data received from the imaging device used by the user exists, the image data or data generated based on the image data to an account of the user of the external service in accordance with the request, and
the imaging device includes:
an authentication request transmitter to transmit, to the image data processing server, an authentication request including authentication information, a notification of which is issued from a user terminal to the imaging device;
an imaging device processing circuitry configured to accept a predetermined user operation;
the imaging device processing circuitry configured to acquire image data by capturing an image of an object when the predetermined user operation is accepted by the imaging device processing circuitry; and an image transmitter to transmit the image data acquired by the imaging device processing circuitry to the image data processing server via the network, wherein the processing circuitry issues, to a first external service that provides a service via a network, access permission to an account of the user in the image data processing server and issues, to a second external service that provides a service via a network, access permission to an account of the user in the image data processing server, when the processing circuitry determines that the image data is image data of a first type and the request receiver receives the request from the first external service, the data transmitter uses the access permission issued to the first external service with respect to a user authenticated as a user of the imaging device having transmitted the image data to transmit the image data or data generated based on the image data to the account of the user in the image data processing server, and when the processing circuitry determines that the image data is image data of a second type and the request receiver receives the request from the second external service, the data transmitter uses the access permission issued to the second external service with respect to a user authenticated as a user of the imaging device having transmitted the image data to transmit the image data or data generated based on the image data to the account of the user in the image data processing server, and after the external service transmits an access token request including an authorization code to the image data processing server, the image data processing server generates the access token and issues the access token in exchange for the authorization code to the external service, and the external service receives the access token generated by the image data processing server.

12. The system according to claim 11, wherein the transmission of image data by the image transmitter is consecutively executed after acquisition of the image data without involving operations other than the predetermined user operation, and processes from reception of the image data by the image receiver to transmission of the image data or data generated based on the image data by the data transmitter are consecutively executed without involving confirmation by the user.

13. An image data processing method that causes a computer to execute:

authenticating a user of an imaging device;

generating an access token for accessing an account of the user in an image data processing server;

issuing the access token to an external service provided by a third party that provides a service via a network;

receiving, via a network, image data which is transmitted from and acquired by the imaging device which is user-authenticated;

determining, using a processing circuitry, a type of the received image data;

receiving, from the external service to which the access token has been issued, a request for image data received from the imaging device used by the user or data generated based on the image data; and transmitting, when the image data received from the imaging device used by the user exists, the image data or data generated based on the image data to an account of the user of the external service in accordance with the request, wherein the processing circuitry issues, to a first external service that provides a service via a network, access permission to an account of the user in the image data processing server and issues, to a second external service that provides a service via a network, access permission to an account of the user in the image data processing server, when the processing circuitry determines that the image data is image data of a first type and the request receiver receives the request from the first external service, the data transmitter uses the access permission issued to the first external service with respect to a user authenticated as a user of the imaging device having transmitted the image data to transmit the image data or data generated based on the image data to the account of the user in the image data processing server, and when the processing circuitry determines that the image data is image data of a second type and the request receiver receives the request from the second external service, the data transmitter uses the access permission issued to the second external service with respect to a user authenticated as a user of the imaging device having transmitted the image data to transmit the image data or data generated based on the image data to the account of the user in the image data processing server, and after the external service transmits an access token request including an authorization code to the image data processing server, the image data processing server generates the access token and issues the access token in exchange for the authorization code to the external service, and the external service receives the access token generated by the image data processing server.

* * * * *